Sept. 6, 1932.　　　　R. S. HUBBELL　　　　1,876,300
VALVE
Filed Aug. 27, 1929　　2 Sheets-Sheet 2

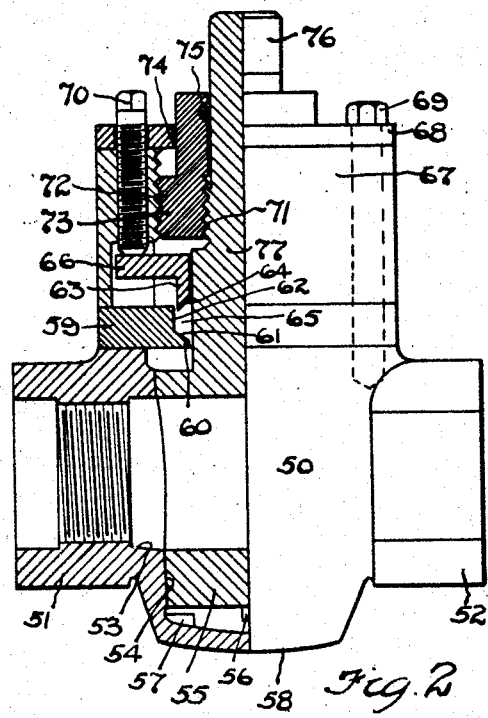
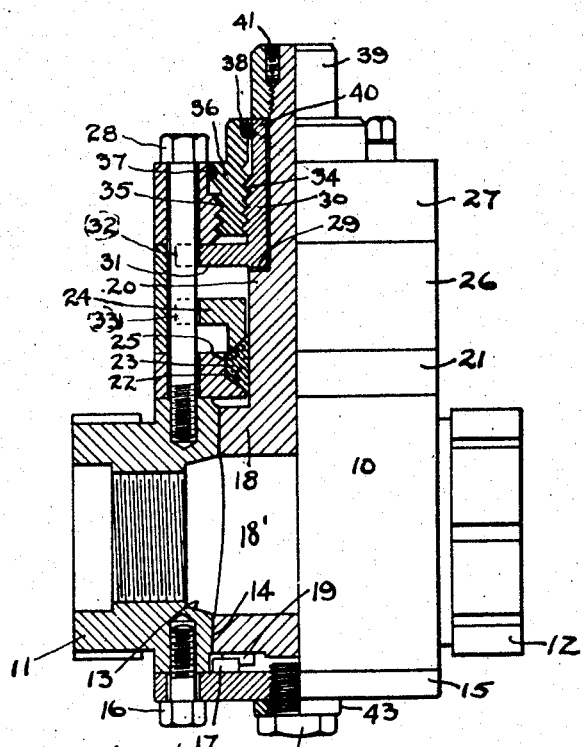

INVENTOR.
Robert S. Hubbell
BY
Fay, Oberlin & Fay
ATTORNEYS.

Patented Sept. 6, 1932

1,876,300

UNITED STATES PATENT OFFICE

ROBERT S. HUBBELL, OF SOUTH EUCLID, OHIO

VALVE

Application filed August 27, 1929. Serial No. 388,750.

The present invention relates, as indicated, to valves, and is more particularly directed to means for providing a perfectly tight seat for valves, and for "breaking" a valve from its seat after the same has become frozen or rusted in position. While the present invention is most particularly adapted for use in connection with rotary plug valves or gate valves which cooperate with tapered seats, it is to be understood that the same may be applied to any type of positively operated valve.

A primary object of the invention is to provide easily operable means for breaking a valve away from its seat. A further object of the invention is to provide suitable packing means for use in certain types of valve organizations. Further objects of the invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 4:
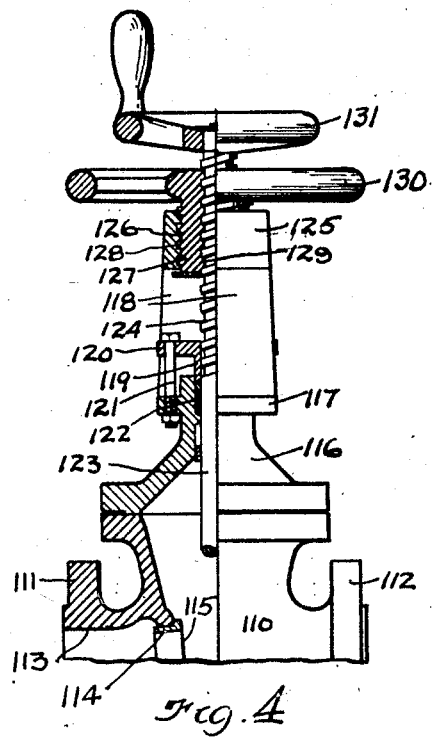
Figure 3:
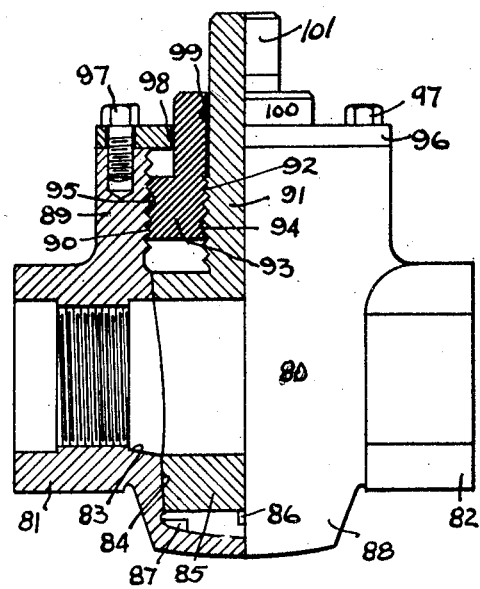

In said annexed drawings:

Fig. 1 is a side elevation, partly in section, of a rotary plug valve constructed in accordance with the present invention; Fig. 2 is a similar view disclosing a different type of rotary plug valve constructed in accordance with my invention; Fig. 3 is a similar view of a slightly different embodiment of my invention; and Fig. 4 is a broken elevation, partly in section, of a gate valve having my invention applied thereto.

Referring more particularly to the drawings, it will be seen that in Fig. 1 I have disclosed a valve casing 10 provided with inlet and outlet hubs 11 and 12, said casing being formed with a through passage 13. An upwardly tapering conical seat 14 is interposed in said passage 13, said seat opening outwardly through the bottom portion of the casing and being adapted to be closed by a plate 15 secured in position by machine screws 16, or equivalent fastening means. The plate 15 is provided with a lug or stop 17 for a purpose later to be described.

Rotatably mounted in the seat 14 is a conical rotary plug valve 18 provided with a bore 18′ adapted, in one position of the plug, to register with the passage 13. At its larger lower end, the plug 18 is provided with a lug 19 adapted to engage the stop 17 on the plate 15.

The plug 18 is provided with a stem 20 projecting outwardly beyond the casing on the side of the said casing opposite from the plate 15. This projecting stem is surrounded and housed, over the major portion of its length, by a composite bonnet built up of the members 21, 26, and 27 hereinafter to be described.

The member 21 is an annular ring, the inner periphery of which extends substantially into contact with the stem 20 and is beveled upwardly and outwardly as at 22. Packing material 23 is located to surround said stem 20 and is supported upon said beveled portion 22 of the ring 21. A second ring 24 is sleeved upon said stem 20, said ring being formed with an outwardly and downwardly beveled surface 25 adapted to engage the upper surface of the mass of packing material 23; and means (not shown) are provided for forcing said ring 24 downwardly to compress the packing material 23 into intimate and sealing engagement with the stem 20.

As will be clear from the drawings, the member 21 has an outside diameter corresponding to that of the casing 10, and a spacing ring or sleeve 26 is superimposed on said member 21 and in turn supports a third ring 27, all three of said members corresponding in outside diameter to the casing 10, whereby they may be said to comprise an extension of said casing. The members 21, 26, and 27 are secured in place by a plurality of machine screws 28 or equivalent fastening means.

Intermediate its ends, and within the limits of the ring 26, the stem 20 is formed with an outwardly facing shoulder 29. A sleeve 30 is slidably received upon the stem 20, and rests upon said shoulder 29. As will be clear from the drawings, said sleeve is provided with a laterally extending flange or arm 31 which is formed with a slot 32, the walls of which embrace one of said screws 28. As will be obvious, this arrangement prevents rotation of the sleeve 30 with respect to the bonnet, while permitting limited reciprocation of said sleeve with respect to said bonnet. It will be noted that the ring 24 is likewise formed with a slot 33, the walls of which embrace the screw 28.

The sleeve 30 is externally formed with a thread 34. The ring 27, forming a portion of the bonnet, is internally formed with a thread 35, the pitch of said thread 35 being very slightly different from the pitch of the thread 34 on the sleeve 30. A bushing 36 is internally formed with a thread corresponding in pitch to the thread 34, and is externally formed with a thread corresponding in pitch to the thread 35. Said bushing 36 is adapted to be received between the sleeve 30 and the ring 27, and to engage the threads of said respective members.

Packing means may be provided between the rings 27 and 30, and as shown, such means may take the form of a packing ring 37 carried by the bushing 36 and engaging the ring 27; and a packing ring 38 carried by the bushing 36 and engaging the sleeve 30.

The upper end of the stem 20 extends beyond the upper end of the bushing 36 and is threaded to receive an adjustable nut 39 adapted to bear upon the upper end 40 of the sleeve 30. It will be seen that, by adjustment of the nut 39, reciprocation of the sleeve 30 with respect to the stem 20 may be absolutely prevented, or may be permitted to a limited extent. Means should be provided for locking the nut 39 in adjusted position, and I prefer that such means shall take the form of a screw 41 threaded axially into a tapped hole formed partly in the stem 20 and partly in the nut 39.

While the operation of the described device is believed to be apparent, it may be desirable to summarize the same very shortly. With the plug 18 in closed position (that is, rotated 90° from the illustrated position), it is essential that the same shall fit the seat 14 very closely to prevent leakage. If the valve is allowed to remain in this position for a relatively long time, experience shows that the plug tends to "freeze" to its seat. When such a condition arises, it is essential that the plug be moved slightly in an axial direction to loosen the same from its seat, it having been found that attempts to rotate a valve which has thus frozen to its seat without such axial movement are very likely to twist the stem of the valve and sometimes to break the same or to score the face of the seat or plug. According to the present invention, a wrench, handle, or other operating means may be applied to the projecting end of the bushing 36 to rotate the same. Rotation of said bushing tends, because of the differential pitches of the threads 34 and 35, to cause reciprocation of the plug 18 in the direction of its axis. It will be obvious that it is desirable to obtain the greatest possible power advantage in order to break the valve from its seat, and that a very fine thread is the best possible means of obtaining such a power advantage. If it should be attempted, however, to use a single thread fine enough to give a strong mechanical advantage such a thread would necessarily be so fine that the strength of the metal therein would be insufficient to withstand the forces applied to it. The same effect, from a mechanical standpoint, can be obtained by providing a differential thread of such character that the difference in pitch between the two threads amounts to the pitch value of a fine thread.

After the valve has been loosened by rotation of the bushing 36, a handle or wrench may be applied to the upper end of the stem 20 to rotate the valve. It will be obvious that the interposition of the sleeve 30 between the bushing 36 and the stem 20 prevents reciprocation of the plug 18 as the result of such rotation of the plug with respect to the bushing 36. After the valve has been moved to open position, the bushing 36 may, if desired, be rotated in the opposite direction again to move the plug 18 into intimate engagement with its seat.

A stop screw 42 may be provided to limit the axial movement of the plug 18, a washer 43 being interposed between the head of said screw 42 and the plate 15 to prevent accidental moving of the screw 42. The screw 42 has a further function, in that it may be used to lock the plug 18 in close relation to its seat during the making of repairs to the valve. As will be obvious, there may be wear on any of the various packing members, or it is possible that one of the various members within the bonnet may be broken or damaged, necessitating replacement thereof. In the absence of specific provision, it will be obvious that, if the bonnet should be removed, the plug 18 might, and probably would, fall away from its seat, thus permitting leakage from the valve casing. Where such repairs are necessary, the screw 42 may be removed from the casing, the washer 43 removed from said screw, and the screw replaced in the casing and turned up tightly against the plug 18 to hold the same in intimate contact with its seat.

Referring now to Fig. 2, it will be seen that I provide a casing 50 having inlet and outlet hubs 51 and 52 communicating with a passage 53 extending through said casing. A downwardly tapered seat 54 is interposed in said passage 53, and a correspondingly tapered plug 55 is rotatably mounted therein. At its lower end, said plug carries a stop lug 56 adapted to engage a similar lug 57 formed in the lower portion 58 of the casing 50.

The plug 55 is formed with a stem 77 extending upwardly beyond the casing, the major portion of said stem being surrounded and housed by a composite bonnet. Said bonnet is built up of the members 59, 67, and 68. The member 59 is a ring, the inner lower edge 60 of which extends substantially in contact with the stem 77. Said member is beveled upwardly and outwardly as at 61 and is formed with a vertical wall 62. A ring 63 is sleeved on said stem 77 and is formed with an outwardly and downwardly beveled surface 64. It will be seen that the members 59 and 63, with their surfaces 61, 62 and 64 form a cavity 65 surrounding the valve stem and adapted to receive packing material. The member 63 is provided with a flange 66 for cooperation with one or more screws 70. As will be obvious, the screws 70 may be operated to force the surface 64 of the member 63 downwardly to compress the packing in the cavity 65 into intimate engagement with the stem 77.

The member 67 is a shell or sleeve superimposed upon the member 59, and the member 68 may be considered as a cover plate, which has the further function of limiting the throw of the plug, said members 59, 67 and 68 being assembled and secured to the casing 50 by means of a plurality of machine screws 69 or equivalent fastening means.

The stem 77 is formed intermediate its ends and within the limits of the member 67 with a thread 71. The sleeve 67 is internally formed with a thread 72 having a pitch slightly different from that of the thread 71. A differentially threaded bushing 73 is received between said member 67 and the stem 77, with its external thread engaging the thread 72 and its internal thread engaging the thread 71.

In this embodiment, the packing means between the bushing 73 and the sleeve 67 and stem 77 may take the form of a packing ring 74 carried by the plate 68 and engaging the bushing 73 and a packing ring 75 carried by the bushing 73 and engaging the stem 77. The upper end 76 of the stem 77 is polygonal in form for engagement by a wrench or handle.

The operation of the embodiment illustrated in Fig. 2 is substantially identical with that of the embodiment illustrated in Fig. 1, save that in the device of Fig. 2, rotation of the stem causes a slight reciprocation of the valve.

In the device of Fig. 3 there is shown a casing 80 having inlet and outlet hubs 81 and 82 leading to and from a passage 83 extending through the casing 80. A downwardly tapered seat 84 is interposed in the passage 83 for the reception of a correspondingly tapered plug 85 which plug is provided with a lug 86 at its lower end for cooperation with a similar lug 87 formed in the lower closed portion 88 of the casing 80.

An annular upstanding flange 89 is provided on the portion of the casing opposite the end 88 thereof and is internally formed with a thread 90. The plug 85 is provided with a stem 91 extending upwardly through the flange 89 and formed with an external thread 92, the pitch of which is slightly different from that of the thread 90. A bushing 93 is internally formed with a thread 94 adapted to cooperate with the thread 92 on the stem 91; and is externally formed with a thread 95 adapted to cooperate with the thread 90 of the flange 89.

A cover plate 96 is secured to the flange 89 by means of a plurality of machine screws 97 or equivalent fastening means, and said plate 96 carries a packing ring 98 engaging the bushing 93. Said bushing 93 in turn carries a packing ring 99 engaging the stem 91. As in the previously described modifications, the bushing 93 has a portion 100 extending beyond the plate 96 for engagement by a wrench or other tool for rotating said bushing; and the stem 91 is formed to provide a portion 101 of polygonal cross-section extending beyond the bushing 93 for engagement by a wrench or handle.

The operation of the device of Fig. 3 is substantially identical with that of the device of Fig. 2.

In Fig. 4 there is illustrated a casing 110 provided with inlet and outlet hubs 111 and 112, said casing being formed with a through passage 113. Interposed in said passage is a pair of seat members 114, only one of which is illustrated, said members being mounted in upwardly divergent planes. It will be seen that the members 114 thus provide a tapered seat 115.

Upon the upper end of said casing 110 there is mounted a bonnet 116 comprising a flange 117, a pair of spaced members 118, and a collar 125. The flange 117 is formed to provide a recess for the reception of packing material 122, and I provide a packing gland 119 formed with a flange 120 with which cooperate a plurality of bolts 121 passing through said flanges 120 and 127 for compressing said packing material 122.

A stem 123 carries at its lower end a gate valve (not shown) and is formed adjacent its upper end with a thread 124. The collar 125 is formed with an internal thread 126, the pitch of which varies slightly from that of the thread 124. A bushing 127 is formed with an external thread 128 for cooperation with the thread 126 of the collar 125 and with an internal thread 129 for cooperation with the thread 124 of the stem 123. Said bushing 127 is preferably provided with a hand wheel 130 either formed integrally with said bushing or secured thereto, and the stem 123 is likewise provided with a hand wheel 131 formed integrally with or secured to said stem.

In operation, if it is desired to open the valve and it is found that the same is frozen to its seat so that operation of the hand wheel 131 is unduly difficult, the hand wheel 130 may be rotated, whereby the high mechanical advantage of the differential thread is applied to start the reciprocation of the stem 123. As soon as the valve is started, the rotation of the hand wheel 130 is stopped and the valve is moved upward quickly from its seat by operation of the hand wheel 131, the stem 123 being threaded through the stationarily held bushing 127. The advantage of the provision of the bushing 127 is likewise apparent when it is desired to close a valve of this character, particularly after the valve or its seat has become worn. It sometimes is found to be impossible, through the operation of the hand wheel 131, to close the valve sufficiently tightly on its seat to prevent leakage. When this condition arises the valve may be moved into as tight engagement with its seat as possible by operation of the hand wheel 131, and thereafter the hand wheel 130 may be operated, with its great power multiplication, to force the valve into still tighter contact with its seat.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a valve, a casing having a passage therethrough and a tapered seat interposed in said passage, a sleeve upstanding from said casing, said sleeve being internally threaded, a valve rotatably mounted in said seat, a stem on said valve and projecting through said sleeve, said stem being externally threaded, a bushing threadedly engaged on said stem and in said sleeve, a packing ring carried by said bushing and engaging said stem, and a second packing ring carried by said bushing and engaging said sleeve.

2. In a valve, a casing formed with a passage therethrough and with a tapered seat interposed in said passage, a valve in said casing and adapted to engage said seat, a bonnet, means for securing said bonnet to said casing, a stem on said valve extending through said bonnet, an annular spacer interposed between said casing and said bonnet, the inner periphery of said spacer extending substantially into engagement with said stem and bevelled upwardly and outwardly, packing material surrounding said stem and supported on the bevelled edge of said spacer, a ring sleeved on said stem and formed with a surface bevelled downwardly and outwardly, means for forcing said ring into engagement with said packing material, and differentially threaded means engaging said stem and said bonnet for reciprocating said valve.

3. In a valve, a casing having a passage therethrough, a seat interposed in said casing, a valve mounted to close on said seat, two annular members projecting from said casing, one of said members being threaded within the casing and the other being threaded within the first, said threads being of different pitch, a stem on said valve projecting through said inner member, and means engaging said inner member and said stem for causing reciprocation of said valve, said means including means whereby said stem may be rotated without causing reciprocation of said valve.

4. In a valve, a casing having a passage therethrough, a seat interposed in said casing, a valve mounted to close on said seat, an annular member projecting from said casing, a stem on said valve projecting through said member, a sleeve rotatably but non-reciprocably mounted on said stem, means for preventing rotation of said sleeve with respect to said member, while permitting reciprocation of said sleeve with respect to said member, and differentially threaded means engaging said member and said sleeve.

5. In a valve, a casing having a passage therethrough, a tapered seat interposed in said passage, a valve mounted to rotate on said seat, a stem on said valve, a sleeve rotatably but non-reciprocably mounted on said stem, said sleeve being externally threaded, a bonnet, means for securing said bonnet on said casing to surround said stem and sleeve, a thread formed internally on said bonnet, the pitch of said bonnet thread differing from that of the thread on said sleeve, and a differentially threaded bushing engaging the threads of said bonnet and sleeve.

6. In a valve, a casing having a passage therethrough, a tapered seat interposed in said passage, a valve mounted to rotate on said seat, a stem on said valve, a sleeve rotatably mounted on said stem, said sleeve being externally threaded, a bonnet, means for securing said bonnet on said casing to surround said stem and sleeve, said means engaging said sleeve to prevent rotation of said sleeve with respect to said bonnet, a thread formed internally on said bonnet, the pitch of said bonnet thread differing from that of the thread on said sleeve, and a differentially threaded bushing engaging the threads of said bonnet and sleeve.

7. In a valve, a casing having a passage therethrough, a tapered seat interposed in said passage, a valve mounted to rotate on said seat, a stem on said valve, said stem being formed intermediate its ends with an outwardly facing shoulder, a sleeve rotatably mounted on said stem and adapted to engage said shoulder at its one end, means engaging the opposite end of said sleeve, said sleeve being externally threaded, a bonnet, means for securing said bonnet on said casing to surround said stem and sleeve, said bonnet being formed internally with a thread differing in pitch from the thread on said sleeve, and a differentially threaded bushing engaging the threads of said bonnet and sleeve.

8. In a valve, a casing having a passage therethrough, a tapered seat interposed in said passage, a valve mounted to rotate on said seat, a stem on said valve, said stem being formed intermediate its ends with an outwardly facing shoulder, a sleeve rotatably mounted on said stem and adapted to engage said shoulder at its one end, a nut adjustably threaded on the outer end of said stem and adapted to engage the opposite end of said sleeve, an external thread on said sleeve, a bonnet, means for securing said bonnet on said casing to surround said stem and sleeve, said means engaging said sleeve to prevent rotation thereof with respect to said bonnet while permitting reciprocation thereof with respect to said bonnet, said bonnet being formed internally with a thread differing in pitch from the thread on said sleeve, and a differentially threaded bushing engaging the threads of said bonnet and sleeve.

9. In a valve, a casing having a passage therethrough, a seat in said casing, a member adapted to close on said seat, a valve stem connected to said member, a bonnet projecting from said casing and having an internally threaded through passage, a bushing externally and internally threaded and screwed into said bonnet passage, external threads on said valve stem engaging internal threads of said bushing, operative engaging means on the outer ends of said bushing and of said stem respectively, the threads connecting said valve stem and bushing being of steeper pitch than those connecting said bushing and bonnet.

Signed by me this 19th day of August, 1929.

ROBERT S. HUBBELL.